(12) United States Patent
Shahane et al.

(10) Patent No.: US 12,524,427 B1
(45) Date of Patent: Jan. 13, 2026

(54) SYSTEM, METHOD, AND COMPUTER PROGRAM FOR SCRAPING PAGE OBJECT MODEL DATA FROM A WEBPAGE

(71) Applicant: Amdocs Development Limited, Limassol (CY)

(72) Inventors: Mahesh Shahane, Pune (IN); Mahesh Kale, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/949,819

(22) Filed: Nov. 15, 2024

(51) Int. Cl.
*G06F 16/00* (2019.01)
*G06F 9/54* (2006.01)
*G06F 16/25* (2019.01)

(52) U.S. Cl.
CPC ............ *G06F 16/254* (2019.01); *G06F 9/547* (2013.01)

(58) Field of Classification Search
CPC ............................... G06F 16/254; G06F 16/25
See application file for complete search history.

(56) References Cited

U.S. PATENT DOCUMENTS

2018/0052811 A1* 2/2018 Gonzalez del Solar ..................... G06F 16/258
2022/0365872 A1* 11/2022 Finkelstein ......... G06F 11/3698

* cited by examiner

*Primary Examiner* — Cheryl Lewis
(74) *Attorney, Agent, or Firm* — Zilka-Kotab, P.C.

(57) ABSTRACT

As described herein, a system, method, and computer program are provided for scraping POM data from webpages. A plug-in tool of a web browser receives input defining one or more parameters for extracting page object model (POM) data from a webpage. The plug-in tool automatically extracts the POM data from the webpage based on the one or more parameters defined in the input.

18 Claims, 7 Drawing Sheets

100

102 — receive input defining one or more parameters for extracting page object model (POM) data from a webpage 104 — automatically extract the POM data from the webpage based on the one or more parameters defined in the input

SYSTEM, METHOD, AND COMPUTER PROGRAM FOR SCRAPING PAGE OBJECT MODEL DATA FROM A WEBPAGE

FIELD OF THE INVENTION

The present invention relates to web scraping processes.

BACKGROUND

In automation development and testing, effectively managing and scraping web pages to extract Page Object Model (POM) data is crucial for ensuring both the accuracy and efficiency of test automation. POM data extraction provides a structured approach to identifying and interacting with web elements, which is essential for creating reliable and maintainable test scripts. By capturing precise and relevant POM data, developers can build a robust framework that reflects the true structure and behavior of the web application, leading to more reliable and effective test automation.

Efficient extraction of this data not only streamlines the development process but also reduces the likelihood of errors and inconsistencies in automated tests, ultimately enhancing the overall quality and effectiveness of the testing framework. However, existing tools often fall short in several ways. Many capture unnecessary elements from the web page into the POM, resulting in inflated POM sizes and increased complexity in maintenance. This not only makes the POM harder to manage but also can introduce performance issues and slow down the test execution. Additionally, these tools frequently lack the capability to record elements based solely on user interactions with the POM object for the currently loaded page.

Addressing these limitations requires a solution that accurately captures only the relevant data and seamlessly integrates with user interactions to streamline the test automation process.

There is thus a need for addressing these and/or other issues associated with the prior art. For example, there is a need to scrape POM data from webpages in a manner that captures only relevant data and that seamlessly integrates with user interactions to streamline a test automation process.

SUMMARY

As described herein, a system, method, and computer program are provided for scraping POM data from webpages. A plug-in tool of a web browser receives input defining one or more parameters for extracting page object model (POM) data from a webpage. The plug-in tool automatically extracts the POM data from the webpage based on the one or more parameters defined in the input.

DETAILED DESCRIPTION

Figure 1:
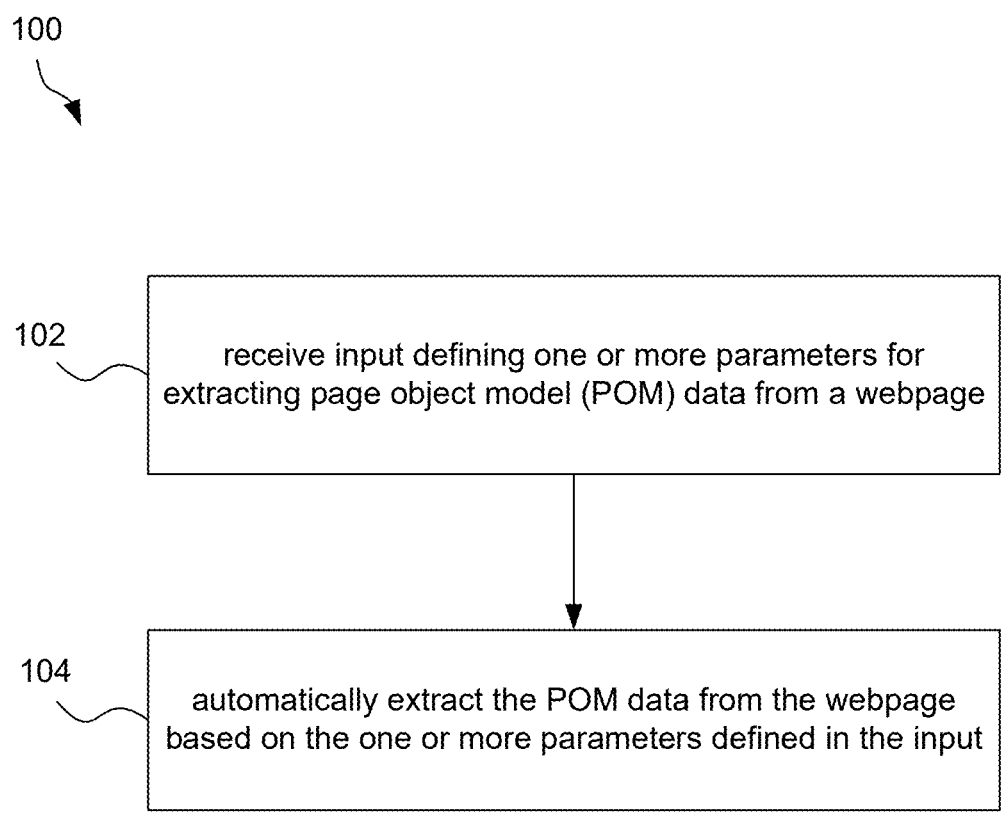
FIG. 1 illustrates a method of a plug-in tool of a web browser that extracts POM data from a webpage, in accordance with one embodiment.

FIG. 1 illustrates a method 100 of a plug-in tool of a web browser that extracts POM data from a webpage, in accordance with one embodiment. The method 100 may be carried out by a computer system, such as that described below with respect to FIGS. 5 and/or 6. For example, the computer system may include the web browser to which the plug-in tool is installed. The plug-in tool is configured to operate in accordance with the method 100.

In operation 102, input defining one or more parameters for extracting page object model (POM) data from a webpage is received. In an embodiment, the webpage may be displayed in the browser. In an embodiment, a user of the browser may navigate to the webpage for the purpose of extracting the POM data therefrom. In this way, the plug-in tool may be used for any desired webpage.

The POM data refers to data that defines a POM of the webpage. The POM of the webpage is a data model of the webpage. The POM of the webpage defines various aspects of the webpage. For example, the POM may define visual and non-visual elements of the webpage, a hierarchical structure of the elements of the webpage, relationships between the elements of the webpage, attributes of the elements of the webpage, etc.

The input that defines the parameter(s) for extracting the POM data may be received from a user, in an embodiment. In other words, the user may provide the input. In an embodiment, the user input may be received via a menu accessible in the browser via the plug-in tool.

In another embodiment, the input that defines the parameter(s) for extracting the POM data may be received from an application. For example, the input may be provided by an application the communicates with the plug-in tool via an application programming interface (API). In an embodiment, the application may be a downstream application to which the extracted POM data is to be output.

The parameter(s) refer to any constraints for extracting the POM from the webpage. In an embodiment, the parameter(s) may indicate elements of the webpage to capture. In an embodiment, the parameter(s) may indicate a structure for the extracted POM data. In an embodiment, the parameter(s) may indicate a format for presenting the extracted POM data.

In operation 104, the POM data is automatically extracted from the webpage based on the one or more parameters defined in the input. The POM data may be extracted by scraping the webpage for the POM data as specified by the one or more parameters defined in the input. In an embodiment, an automated extraction process may be used to automatically extract the POM data from the webpage. In an embodiment, the automated extraction process may be a component of the plug-in tool.

To this end, the method 100 may allow for a customization of the POM data that is extracted from a webpage. In particular, this customization may be made via the input defining the parameter(s) for extracting the POM data from the webpage. As mentioned above, the customization may be made by a user or by an application.

In a further embodiment, the method 100 may include outputting the extracted POM data. In an embodiment, the extracted POM data may be output to a user of the web browser. In an embodiment, the extracted POM data may be exported to a file.

In an embodiment, the extracted POM data may be output to a downstream application. For example, the downstream application may be a test automation application. In an embodiment, outputting the extracted POM data to the test automation application may cause the test automation application to process the extracted POM data to generate at least one test automation script for the web page and to execute the at least one test automation script to test the web page.

In an embodiment, a parameter included in the input may specify an output destination for the extracted POM data. The output destination may be the web browser, the file, the downstream application, etc. In an embodiment, the extracted POM data may then be output by the method 100 to the output destination. In this way, the output destination may also be customized per the input.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
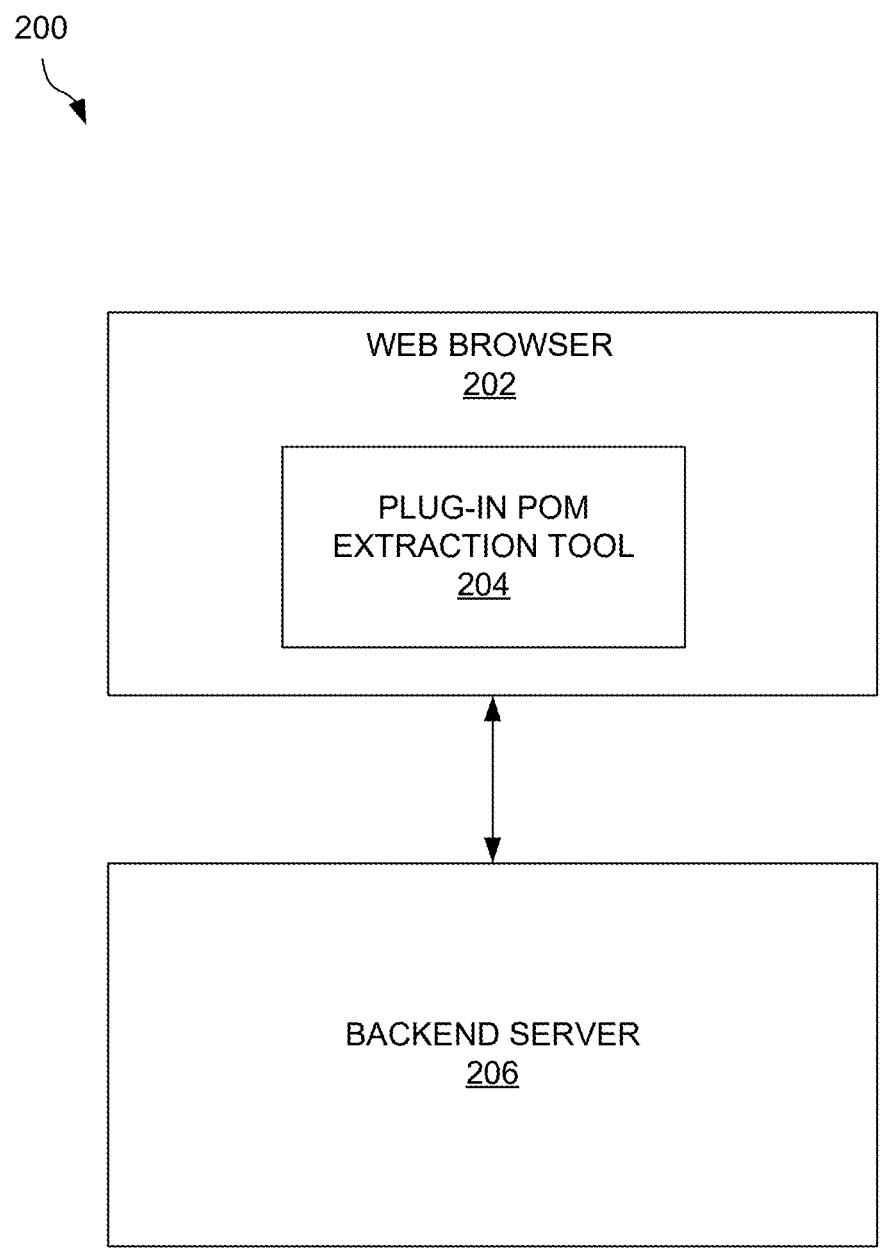
FIG. 2 illustrates a system for extracting POM data from a webpage, in accordance with one embodiment.

FIG. 2 illustrates a system 200 for extracting POM data from a webpage, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a web browser 202. The web browser is an application of a computer system that allows the computer system to access and display webpages from the internet. The web browser 202 includes a plug-in POM extraction tool 204 installed therewith. In an embodiment, the plug-in POM extraction tool 204 may be installed as an extension to the web browser 202.

When the web browser 202 navigates to a webpage, the web browser 202 retrieves the webpage from a backend server 206. The plug-in POM extraction tool 204 can then be used to automatically extract POM data from the webpage. In the context of the present embodiment, the plug-in POM extraction tool 204 is configured to automatically extract the POM data in accordance with one or more defined parameters that are input to the plug-in POM extraction tool 204. Thus, the one or more defined parameters are not preconfigured as part of the plug-in POM extraction tool 204, but are input from an external source to customize the manner in which the POM data is extracted from the webpage. The parameters may be input by a user or an application. The POM data may be automatically extracted per the method 100 of FIG. 1.

The plug-in POM extraction tool 204 further outputs the extracted POM data. In an embodiment, the plug-in POM extraction tool 204 may output the extracted POM data to the browser 202 (e.g. for viewing by a user). In another embodiment, the plug-in POM extraction tool 204 may output the extracted POM data to a file which may be stored in a memory (not shown). In yet another embodiment, the plug-in POM extraction tool 204 may output the extracted POM data to a downstream application (not shown), for example via an API of the downstream application.

As an option, the plug-in POM extraction tool 204 may also interface another backend server (not shown). This other backend server may be configured to handle backend server associated with the extracted POM data, to manage and store the extracted POM data, and/or to provides an endpoint for communication between the plug-in POM extraction tool 204 and the backend server.

Exemplary Use Case for the System 200

A user interacts with the plug-in POM extraction tool 204 by right-clicking on the webpage and selecting the context menu item for extracting POM data. The context menu item allows the user to input parameters for extracting POM data from the webpage.

A webpage scraper component of the plug-in POM extraction tool 204 parses a hypertext markup language (HTML) structure of the webpage. From the parsed HTML, the plug-in POM extraction tool 204 extracts data relevant to the POM of the webpage and formats the extracted POM data into a usable structure, both in accordance with the user input parameters. The POM data is then presented to the user via the browser 202. The user may also export or copy the POM data. The user may configure a manner in which the POM data is displayed in the browser 202.

Figure 3A:
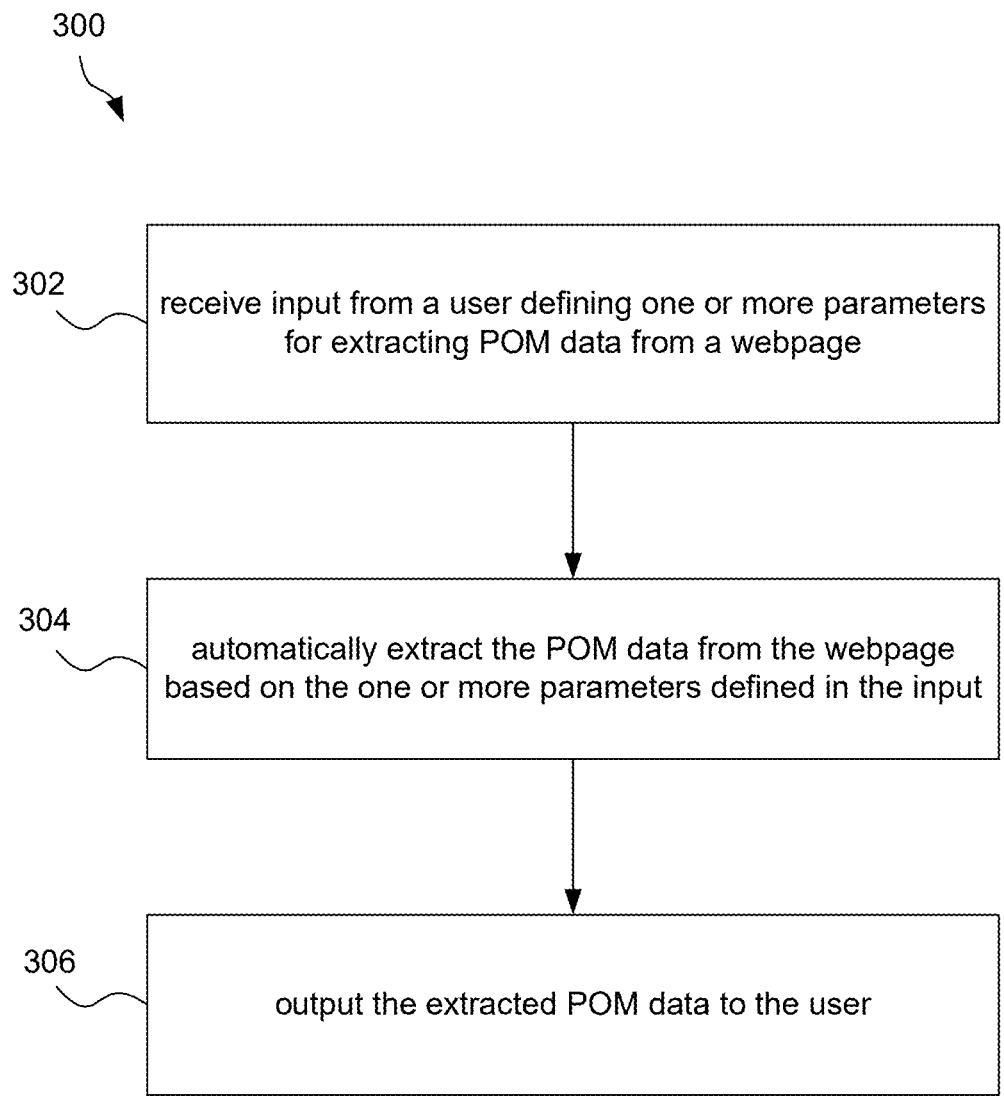
FIG. 3A illustrates a method for use of the plug-in tool of the system of FIG. 2 by a user, in accordance with one embodiment.

FIG. 3A illustrates a method 300 for use of the plug-in tool 204 of the system 200 of FIG. 2 by a user, in accordance with one embodiment. The method 300 may be performed by the plug-in tool 204, in an embodiment.

Figure 3B:
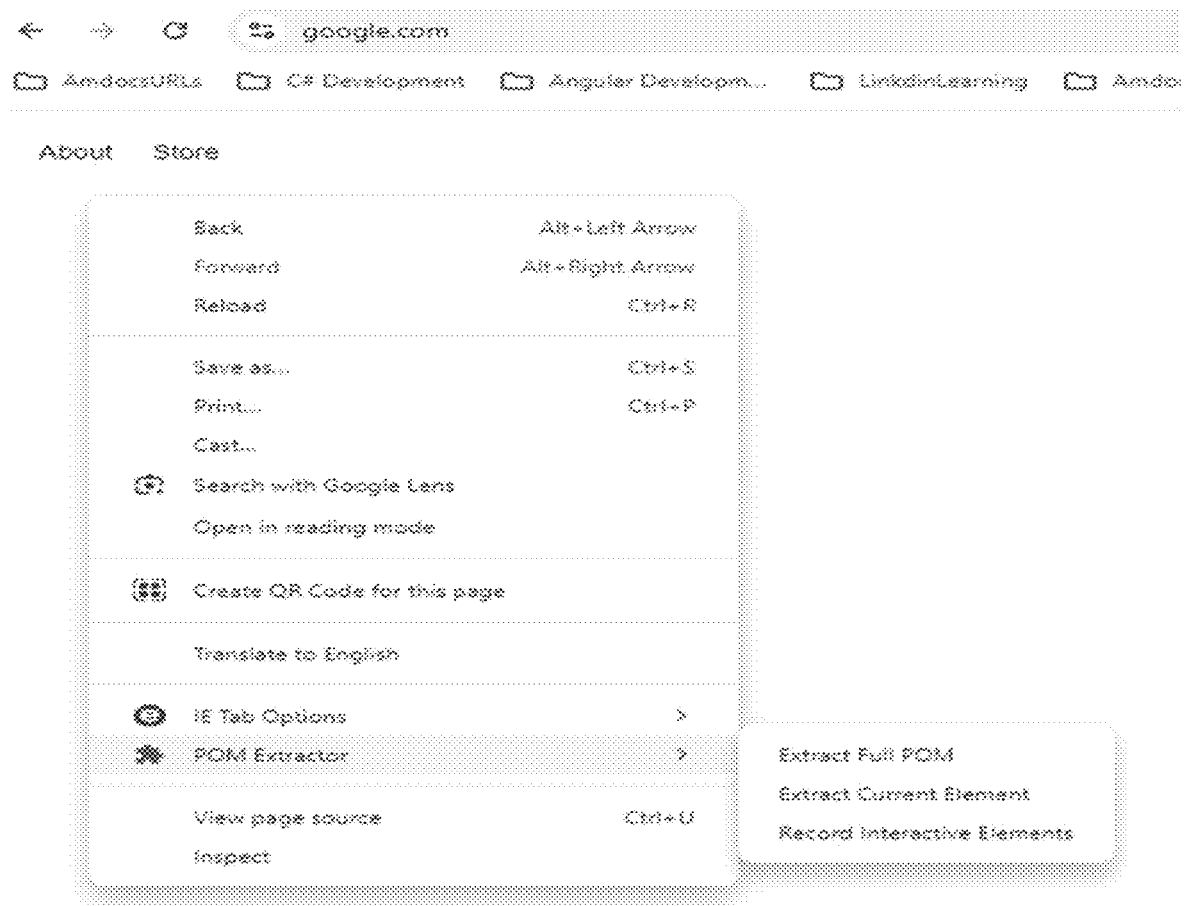
FIG. 3B illustrates an exemplary graphical user interface (GUI) presenting a menu in a browser for use by a user to input parameters for extracting POM data from a webpage, in accordance with one embodiment.

In operation 302, input is received from a user defining one or more parameters for extracting POM data from a webpage. The input may be received via a menu displayed to the user in the web browser (e.g. via the exemplary menu presented in FIG. 3B). The input may define elements of the web page to extract, a structure for the extracted POM data, a format for outputting the extracted POM data, etc.

In operation 304, the POM data is automatically extracted from the webpage based on the one or more parameters defined in the input. In particular, the POM data is extracted from the webpage in accordance with the parameters defined in the input. Thus, for example, POM data for only defined elements of the webpage may be extracted. As another example, the POM data may be extracted into a defined structure. As yet another example, the extracted POM data may be placed in a defined output format.

In operation 306, the extracted POM data is output to the user. For example, the extracted POM data may be output in the defined output format. When no output format is defined by the user input, then the extracted POM data may be output in a default format. In an embodiment, the extracted POM data may be output to the user in the web browser.

Figure 4:
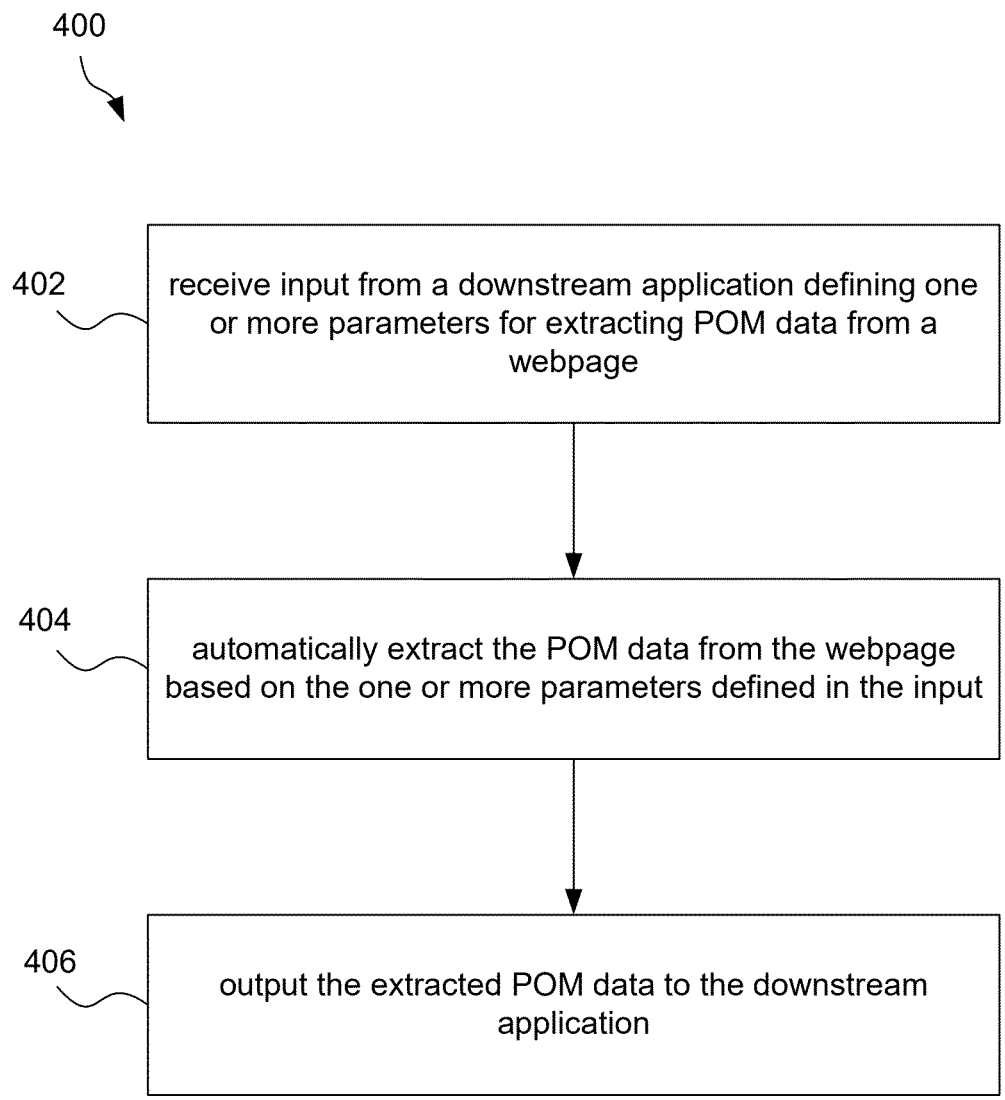
FIG. 4 illustrates a method for use of the plug-in tool of the system of FIG. 2 by a downstream application, in accordance with one embodiment.

FIG. 4 illustrates a method 400 for use of the plug-in tool 204 of the system 200 of FIG. 2 by a downstream application, in accordance with one embodiment. The method 400 may be performed by the plug-in tool 204, in an embodiment.

In operation 402, input is received from a downstream application defining one or more parameters for extracting POM data from a webpage. The input may be received an API. The input may define elements of the web page to extract, a structure for the extracted POM data, a format for outputting the extracted POM data, etc.

In operation 404, the POM data is automatically extracted from the webpage based on the one or more parameters defined in the input. In particular, the POM data is extracted from the webpage in accordance with the parameters defined in the input. Thus, for example, POM data for only defined elements of the webpage may be extracted. As another example, the POM data may be extracted into a defined structure. As yet another example, the extracted POM data may be placed in a defined output format.

In operation 406, the extracted POM data is output to the downstream application. For example, the extracted POM data may be output in the defined output format. When no output format is defined by the user input, then the extracted POM data may be output in a default format. In an embodiment, the extracted POM data may be output to the downstream application via an API.

Table 1 illustrates exemplary code for configuring the downstream application with the plug-in tool 204.

TABLE 1

```
function connectWebSocket( ) {
  // Replace with your WebSocket server URL
  const url = "wss://your-websocket-server.com/socket";
  socket = new WebSocket(url);
  socket.onopen = ( ) => {
    console.log("WebSocket connected");
  };
  socket.onmessage = (event) => {
  console.log("Message received:", event.data);
    // Send the received message back to the popup
    chrome.runtime.sendMessage({ action: "receiveMessage",
    data: event.data });
  };
  socket.onclose = ( ) => {
    console.log("WebSocket disconnected");
  };
  socket.onerror = (error) => {
    console.error("WebSocket error:", error);
  };
}
// Call the function to establish the WebSocket connection.
connectWebSocket( );
// Listen for messages from the popup
chrome.runtime.onMessage.addListener((request, sender,
sendResponse) => {
  if (request.action === "sendMessage") {
    if (socket && socket.readyState === WebSocket.OPEN) {
      socket.send(request.data);
    } else {
      console.error("WebSocket is not open. Cannot send message.");
    }
  }
});
```

Test Automation Implementation

The downstream application may then process the POM data to generate an output. For example, where the downstream application is a test automation application, the POM data may be processed to generate one or more test automation scripts. The test automation script(s) may then be executed to test the webpage.

Designed with an emphasis on ease of use, the plug-in tool 204 may provide a straightforward interface that simplifies the process of capturing and managing POM data, enhancing overall productivity in automation development and testing. By automating the extraction of relevant POM data and integrating it directly into a testing workflow, the plug-in tool 204 may help to reduce errors, streamline the development process, and improve the overall effectiveness of test automation.

Figure 5:
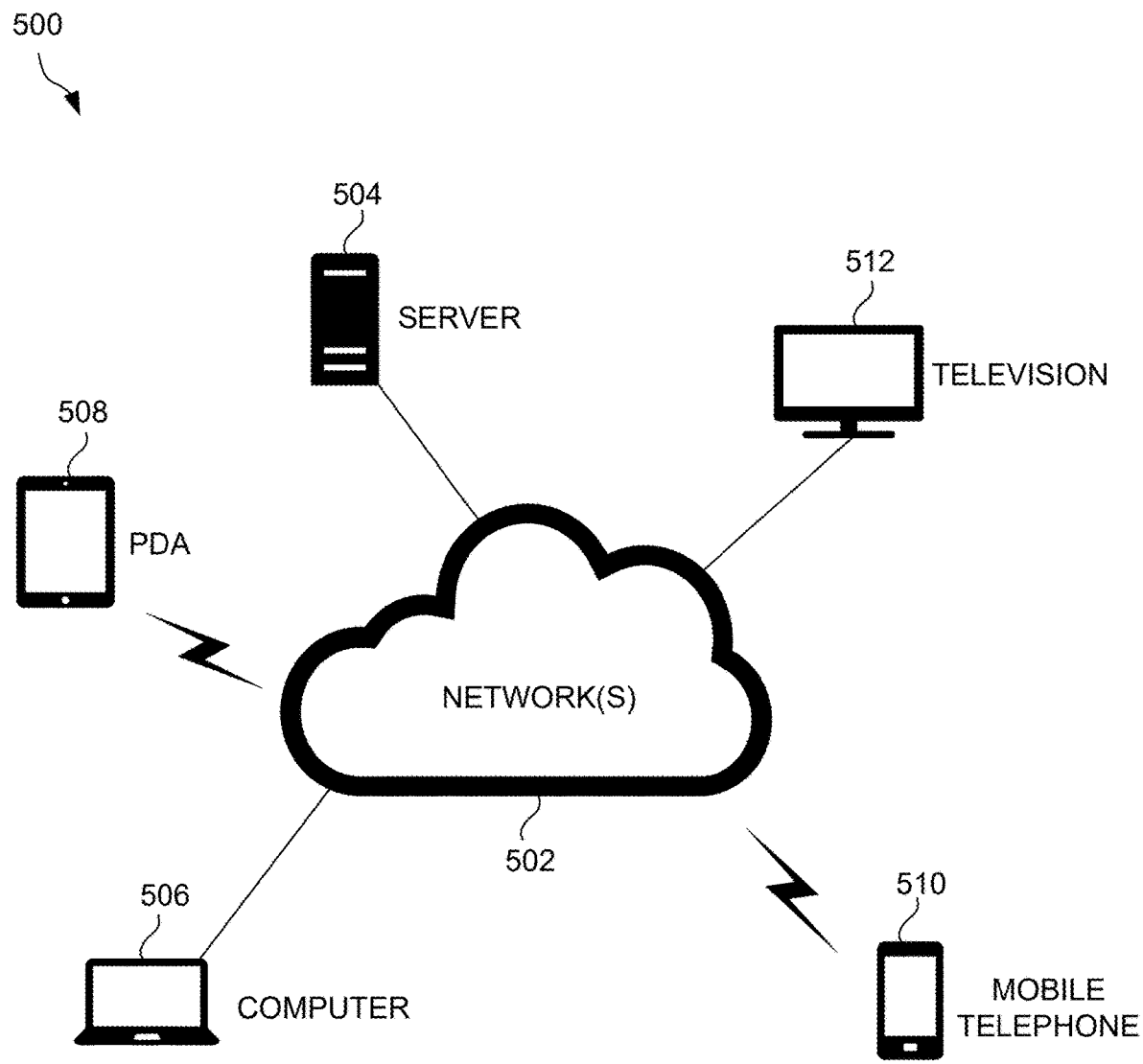
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
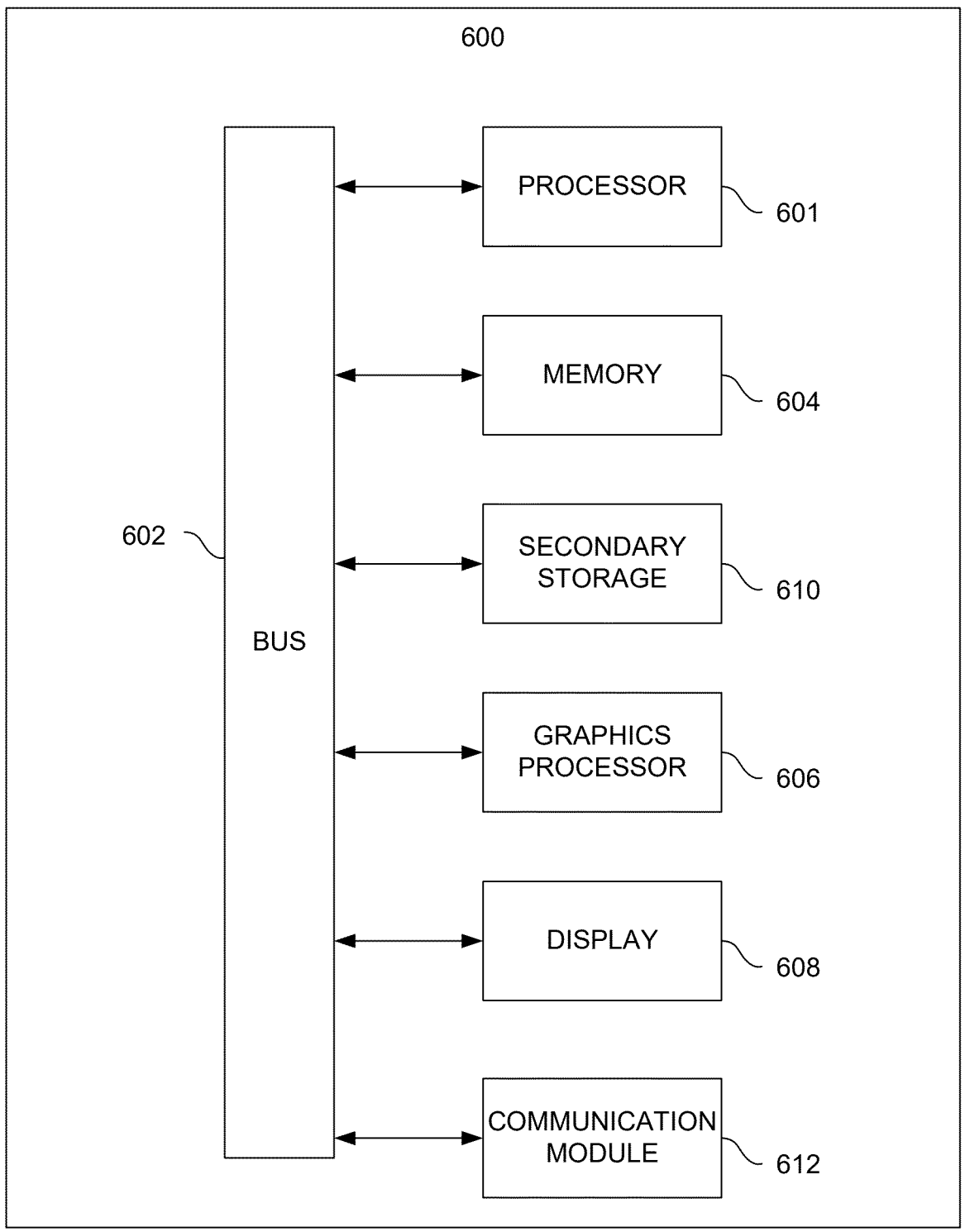
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   receive, via a plug-in tool of a web browser, input defining parameters for extracting page object model (POM) data from a webpage, the parameters representing a customization for the POM data by indicating:
       which elements of the webpage to capture in the POM data,
       a structure for the POM data, and
       a format for presenting the POM data; and
   automatically extract, by the plug-in tool, the POM data from the webpage in accordance with the parameters defined in the input such that:
       only the elements of the webpage indicated by the parameters are captured in the POM data,
       the POM data is structured as indicated by the parameters, and
       the POM data is formatted for presentation as indicated by the parameters.

2. The non-transitory computer-readable media of claim 1, wherein the web browser displays the webpage.

3. The non-transitory computer-readable media of claim 1, wherein the input is provided by a user.

4. The non-transitory computer-readable media of claim 3, wherein the user input is received via a menu accessible in the browser via the plug-in tool.

5. The non-transitory computer-readable media of claim 1, wherein the input is provided by an application the communicates with the plug-in tool via an application programming interface.

6. The non-transitory computer-readable media of claim 5, wherein the application is a downstream application to which the extracted POM data is output.

7. The non-transitory computer-readable media of claim 1, wherein the POM data indicates the elements captured from the webpage, a hierarchical structure of the elements captured from the webpage, attributes of the elements captured from the webpage, and relationships between the elements captured from the webpage.

8. The non-transitory computer-readable media of claim 1, wherein the device is further caused to:
output the extracted POM data.

9. The non-transitory computer-readable media of claim 8, where the extracted POM data is output to a user of the web browser.

10. The non-transitory computer-readable media of claim 8, where the extracted POM data is exported to a file.

11. The non-transitory computer-readable media of claim 8, where the extracted POM data is output to a downstream application.

12. The non-transitory computer-readable media of claim 11, wherein the downstream application is a test automation application.

13. The non-transitory computer-readable media of claim 12, wherein outputting the extracted POM data to the test automation application causes the test automation application to:
process the extracted POM data to generate at least one test automation script for the web page, and
execute the at least one test automation script to test the web page.

14. The non-transitory computer-readable media of claim 1, wherein a parameter included in the input specifies an output destination for the extracted POM data.

15. The non-transitory computer-readable media of claim 14, wherein the device is further caused to:
output the extracted POM data to the output destination.

16. The non-transitory computer-readable media of claim 1, wherein:
the input is received by:
a user right-clicking on the webpage and selecting a context menu item for extracting POM data,
receiving, via the context menu item, the parameters for extracting the POM data; and the POM data is extracted from the webpage by:
parsing, by the plug-in tool, a hypertext markup language (HTML) structure of the webpage,
extracting, by the plug-in tool, the POM data from the parsed HTML.

17. A method, comprising:
at a computer system:
receiving, via a plug-in tool of a web browser, input defining parameters for extracting page object model (POM) data from a webpage, the parameters representing a customization for the POM data by indicating:
which elements of the webpage to capture in the POM data,
a structure for the POM data, and
a format for presenting the POM data; and
automatically extracting, by the plug-in tool, the POM data from the webpage in accordance with the parameters defined in the input such that:
only the elements of the webpage indicated by the parameters are captured in the POM data,
the POM data is structured as indicated by the parameters, and
the POM data is formatted for presentation as indicated by the parameters.

18. A system, comprising:
a non-transitory memory storing instructions; and
one or more processors in communication with the non-transitory memory that execute the instructions to:
receive, via a plug-in tool of a web browser, input defining parameters for extracting page object model (POM) data from a webpage, the parameters representing a customization for the POM data by indicating:
which elements of the webpage to capture in the POM data,
a structure for the POM data, and
a format for presenting the POM data; and
automatically extract, by the plug-in tool, the POM data from the webpage in accordance with the parameters defined in the input such that:
only the elements of the webpage indicated by the parameters are captured in the POM data,
the POM data is structured as indicated by the parameters, and
the POM data is formatted for presentation as indicated by the parameters.

* * * * *